(12) United States Patent
Vassilovski et al.

(10) Patent No.: US 8,087,014 B1
(45) Date of Patent: Dec. 27, 2011

(54) METHOD AND APPARATUS FOR CONFIGURATION MANAGEMENT FOR A COMPUTING DEVICE

(75) Inventors: Dan Vassilovski, Del Mar, CA (US); Henry Tong, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 254 days.

(21) Appl. No.: 09/698,526

(22) Filed: Oct. 26, 2000

(51) Int. Cl.
*G06F 9/44* (2006.01)
*G06F 9/445* (2006.01)

(52) U.S. Cl. ........ 717/171; 717/168; 717/173; 717/174; 717/176; 717/178

(58) Field of Classification Search .......... 717/168–178; 713/189–201; 705/51–59; 714/25; 707/1–10
See application file for complete search history.

(56) References Cited

U.S. PATENT DOCUMENTS

| | | | |
|---|---|---|---|
| 5,065,400 A * | 11/1991 | Masuishi et al. ............... | 717/110 |
| 5,628,015 A * | 5/1997 | Singh ............................. | 713/200 |
| 5,752,041 A * | 5/1998 | Fosdick ......................... | 717/178 |
| 6,058,478 A * | 5/2000 | Davis ............................ | 713/173 |
| 6,151,643 A * | 11/2000 | Cheng et al. ................... | 714/25 |
| 6,167,521 A * | 12/2000 | Smith et al. ................... | 726/21 |
| 6,256,393 B1 * | 7/2001 | Safadi et al. .................. | 380/232 |
| 6,256,668 B1 * | 7/2001 | Slivka et al. .................. | 709/220 |
| 6,343,379 B1 * | 1/2002 | Ozawa et al. .................. | 725/63 |
| 6,363,402 B1 | 3/2002 | Matsuura | |
| 6,378,069 B1 * | 4/2002 | Sandler et al. ................ | 713/153 |
| 6,381,741 B1 * | 4/2002 | Shaw ........................... | 717/168 |
| 6,463,474 B1 * | 10/2002 | Fuh et al. ....................... | 713/201 |
| 6,477,703 B1 * | 11/2002 | Smith et al. ................... | 717/168 |
| 6,496,979 B1 * | 12/2002 | Chen et al. ..................... | 717/178 |
| 6,567,793 B1 * | 5/2003 | Hicks et al. ..................... | 705/51 |
| 6,609,199 B1 * | 8/2003 | DeTreville ..................... | 713/172 |
| 6,694,434 B1 * | 2/2004 | McGee et al. ................. | 713/189 |
| 6,742,121 B1 * | 5/2004 | Safadi ............................ | 713/187 |
| 2005/0027988 A1 * | 2/2005 | Bodrov .......................... | 713/176 |

FOREIGN PATENT DOCUMENTS

| | | |
|---|---|---|
| EP | 0706275 A | 4/1996 |
| EP | 0814398 A | 12/1997 |
| EP | 0918275 A | 5/1999 |
| EP | 0997807 A2 | 5/2000 |
| JP | 04-167139 | 6/1992 |
| WO | 98015082 | 4/1998 |

OTHER PUBLICATIONS

Dictionary of Computing, Fourth Edition; Oxford University Press, 1996; p. 28.*
International Search Report -PCT/US01/050893, International Search Authority-European Patent Office, Apr. 22, 2003.

* cited by examiner

*Primary Examiner* — Insun Kang
(74) *Attorney, Agent, or Firm* — Won Tae Kim

(57) ABSTRACT

A method and apparatus for configuration management for a computing device. The apparatus comprises an interface for providing available software to the computing device to be loaded onto the computing device. A processor executes a set of computer instructions to determine whether or not software resident in the computing device is authenticated or not. If the resident software is not authenticated, the processor loads the available software onto the computing device. If the resident software is authenticated, the processor loads the available software only if the available software is also authenticated.

37 Claims, 2 Drawing Sheets

US 8,087,014 B1

METHOD AND APPARATUS FOR CONFIGURATION MANAGEMENT FOR A COMPUTING DEVICE

GOVERNMENT LICENSE RIGHTS TO CONTRACTOR-OWNED INVENTIONS MADE UNDER FEDERALLY SPONSORED RESEARCH AND DEVELOPMENT

The U.S. Government has a paid-up license in this invention and the right in limited circumstances to require the patent owner to license others on reasonable terms as provided for by the terms of contract no. MDA904-96-G-0035 awarded by the National Security Agency.

BACKGROUND OF THE INVENTION

I. Field of the Invention

The method and apparatus for configuration management relates generally to the field of software management and more particularly to a method and apparatus for providing configuration management of software used for a general computing device.

II. Description of the Related Art

In modern computing systems, it is often important to effectively manage a software configuration that is embodied within a computing system. Such computing systems include not only traditional computers found in businesses and homes, but also a wide variety of electronics, including wireless telephones, laptop computers, personal digital assistants (PDAs), automotive electronics, and so on. Such computing systems sometimes employ methods to ensure software compatibility by checking a current software version with that of a newer version of software to be loaded. However, these methods do not attempt to prevent an upgrade of existing software, or the introduction of new software, under certain conditions.

One example of a need to manage and control the type or version of software to be loaded onto a computing device can be found in security applications for such computing devices. For example, in a governmental organization where each person is given a wireless communication device, the organization might be segregated into different security levels. If a person having a lower security level were to acquire a wireless communication device belonging to a person having a higher security level, that person might try to load software onto the wireless communication device so that he might be able to access information that would be otherwise unavailable to him. In another aspect of this example, it would be desirable to only load authenticated software into the wireless communication device once the wireless communication device has been given to a person having a high security level. Authenticated software refers to software that has been distributed by a "trusted" source, and that it has not been altered.

Thus, there is a need for a method and apparatus to perform configuration management and control for software used in a computing device.

SUMMARY OF THE INVENTION

The problem of performing configuration management and control for software used in a computing device is solved, in one embodiment, by a method for software configuration management, comprising the steps of providing available software to an interface associated with a computing device, then determining whether or not resident software stored in an application storage area associated with the computing device has been authenticated. If the resident software has not been authenticated, the available software is loaded onto the computing device. If the resident software has been authenticated, the available software is loaded only if it has also been authenticated.

In another embodiment, the problem of performing configuration management and control for software used in a computing device is solved by an apparatus for software configuration management, comprising an interface for providing available software to the computing device and a storage device for storing resident software and data. The apparatus further comprises a processor for executing a set of computer instructions for determining whether or not the resident software is authenticated. The processor loads the available software if the resident software has not been authenticated. If the resident software has been authenticated, the available software is loaded only if it has also been authenticated.

BRIEF DESCRIPTION OF THE DRAWINGS

The features, objects, and advantages of the present invention will become more apparent from the detailed description set forth below when taken in conjunction with the drawings wherein.

DESCRIPTION OF THE PREFERRED EMBODIMENT

A method and apparatus for configuration management for a computing device is presented. It should be understood that the disclosed method and apparatus may be applied to a variety of computing devices, including portable and desktop computers, mainframe computers, personal digital assistants (PDAs), wireline and wireless communication devices offering voice and/or data communication services, to name a few. In general, the disclosed method and apparatus may be applied to any electronic device requiring software to perform an intended task.

Figure 1:
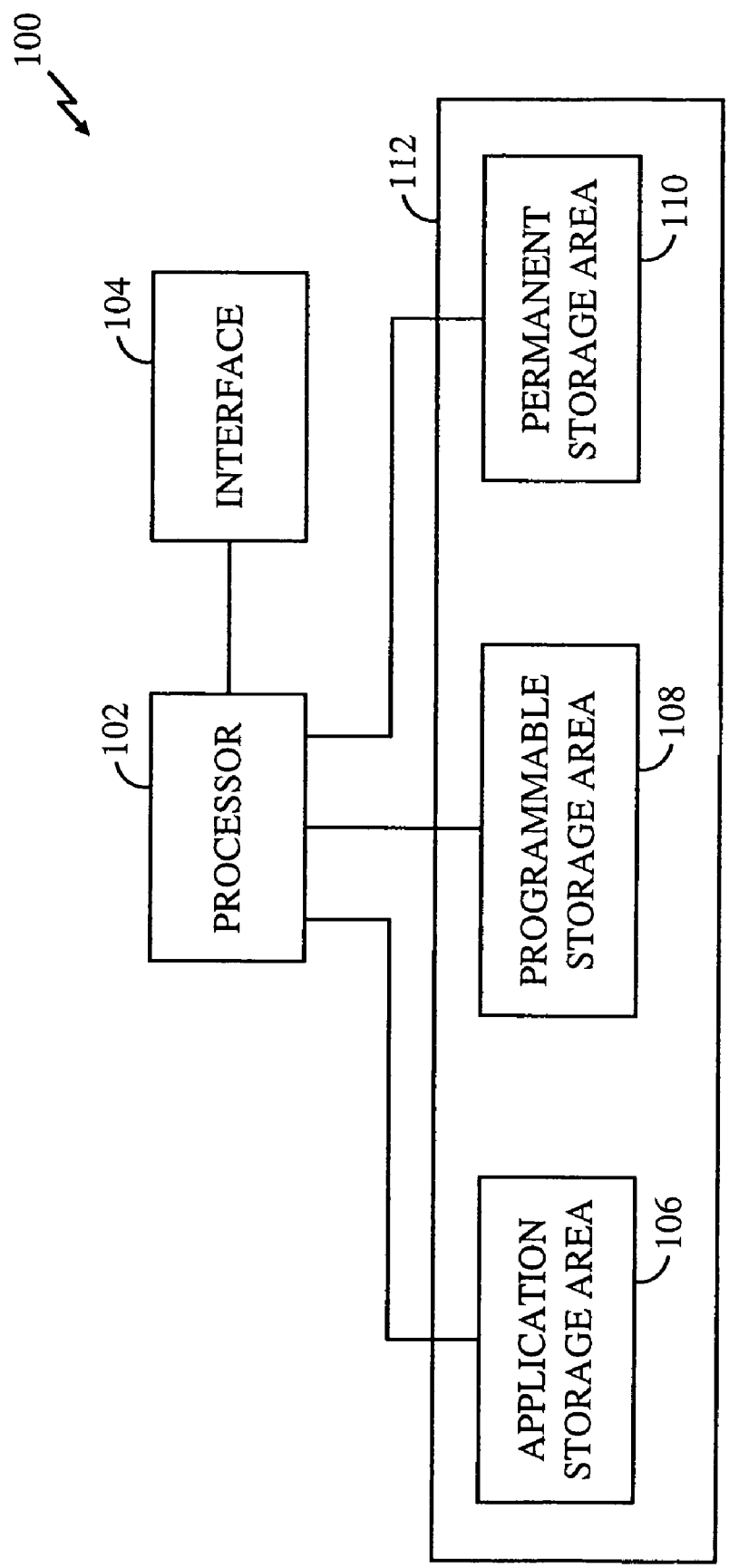
FIG. 1 illustrates a computing device in functional block diagram format.

FIG. 1 illustrates computing device 100 in functional block diagram format. In one embodiment, computing device 100 comprises processor 102, interface 104, storage device 112 comprising application storage area 106, programmable storage area 108, and permanent storage area 110. It should be understood that other configurations are possible, and that the method and apparatus described herein could be implemented in any number of possible configurations.

As stated earlier, computing device 100 comprises any electronic device which requires software to perform its intended task. In one embodiment, computing device 100 comprises a wireless data device such as a wireless telephone having data capabilities to perform such tasks as manage schedules, access the Internet, send and receive email, and so on. The remaining discussion herein will describe the method and apparatus for providing configuration management for a computing device with respect to such a wireless communication device. It should be understood that the method and apparatus for providing configuration management for a computing device could also be applied to any computing device which uses software to perform its intended function.

Processor 102 comprises a digital processor for executing one or more sets of executable software instructions stored in storage device 112. In one embodiment, processor 102 comprises a digital microprocessor such as one from the 80×86 family of processors from Intel Corporation of Santa Clara, Calif. In another embodiment, processor 102 comprises a digital signal processor (DSP), such as the TMS320 series from Texas Instruments Incorporated of Dallas, Tex. In another embodiment, processor 102 comprises a custom ASIC. Other configurations known in the art may be used in the alternative.

Computing device 100 is initially provisioned with executable computer instructions to allow certain core activities to occur, for instance, just after computing device 100 is powered on. These executable computer instructions are herein referred to as a kernel. The kernel may perform a variety of self-tests by instructing executable computer instructions stored in either application storage area 106, programmable storage area 108, or the kernel may execute its own series of self-tests. In addition, the kernel may initiate other software programs such as an operating system, such as Windows CE, used to host other software programs. The kernel also comprises executable computer instructions for providing configuration management of software as it is loaded into computing device 100.

Computing device 100 can generally run one or more software programs, either simultaneously or in sequence with each other. For example, an email program and an Internet browser could be executed simultaneously by processor 102. Other examples of software that may be operated by computing device 100 include word processing software, spreadsheet software, communication software, encryption software, etc.

In one embodiment, a user desiring to add software to computing device 100 provides the software to computing device 100 using interface 104. The software to be loaded is referred to herein as the available software. Interface 104 comprises an apparatus for allowing communication between computing device 100 and an external electronic device, such as a second computing device. Interface 104 comprises a disk drive, a parallel port, or a serial port, or any other electronic interface which allows software to be loaded onto computing device 100. In another embodiment, interface 104 comprises a wireless communication system for receiving software over-the-air.

Instructions are given to processor 102, either automatically by the presence of available software at interface 104, or by the user explicitly instructing processor 102 using an I/O device such as a keypad and display, to load the available software from interface 104 into storage device 106.

Processor 102, upon receiving instructions for loading the available software at interface 104, may temporarily accept the software and store it in programmable storage area 108 within storage device 112. Storage device 112 comprises one or more electronic memories for storing executable software programs and supporting data. More specifically, programmable storage device 108 comprises a random access memory (RAM), flash RAM, electrically erasable programmable read-only memory (EEPROM), or other erasable electronic memory which is known in the art. If storage device 112 comprises more than one storage device, various combinations of technologies could be used to store information relating to the operation of computing device 100.

In one embodiment, storage device 112 is divided into two or more storage areas, denoted in FIG. 1 as application storage area 106, programmable storage area 108, and permanent storage area 110. Application storage area 106 stores software programs, generally in executable form, and associated data. Programmable storage area 108 stores information on a temporary basis. For example, data generated by software from application storage area 106 may generate data to be used by a computing device operator and could be stored in programmable storage area. Programmable storage area could also be used to store available software temporarily until various authentication procedures have been accomplished. The available software stored in programmable storage area 108 may then be erased or moved to application storage area 106 depending on the results of the authentication processes. Permanent storage area 110 comprises an area of storage device 112 where the kernal is stored. This area of storage device 112 is generally not able to be altered by processor 102, unlike application storage area 106 and programmable storage area 108. In addition, permanent storage area 110 stores an "authentication flag", which is explained below, in one embodiment.

After receiving instructions to load the available software, either from interface 104 or stored in programmable storage area 108, processor 102 determines whether or not resident software corresponding to the available software has been authenticated, in one embodiment. In another embodiment, processor 102 determines if resident software unrelated to the available software has been authenticated. For example, processor 102 would determine if an operating system software has been authenticated prior to loading an application such as an encryption program or a word processing program. Resident software is defined herein as software that is stored in storage device 112 and capable of being executed by processor 102.

Authentication is a well-known technique for verifying that software from a "trusted source" has not been altered. Authenticating software involves appending an alpha-numeric authentication code to software in which a recipient's "private key", or private code, is used to generate the alpha-numeric authentication code. When the software is received by the recipient, in this case computing device 100, the software may be authenticated by computing device 102 performing an authentication procedure on the authentication code. In one embodiment, the authentication procedure comprises running a cyclic redundancy check (CRC). In another embodiment, the authentication procedure comprises running a secure hashing algorithm (SHA). Both methods are well known in the art. Of course, other known methods may be used to authenticate software provided to computing device 100.

The authentication process may be aided by the presence of an "authentication flag". An authentication flag is an indication that at least one piece of authenticated software has been loaded into computing device 100. In one embodiment, the authentication flag comprises an indication in permanent storage area 110. For example, as software is loaded onto computing device 100, it is first checked by processor 102 to determine if it is authenticated or not. If processor 102 determines that the software is authenticated, the authentication flag is set in permanent storage area 110 by processor 102. Once the authentication flag is set, it normally cannot be reset. Therefore, once an authenticated piece of software has been loaded onto computing device 100, any further software to be loaded onto computing device 100 will have to be authenticated. Otherwise it will be rejected, as explained below.

In another embodiment, the authentication flag comprises a hardware "fuse". A hardware fuse is a well known device which generally comprises a conductor capable of being destroyed by an electric current. In the present case, if processor 102 determines that a piece of authenticated software has been loaded onto computing device 100, processor 102 sends a signal to "set" the hardware fuse, i.e., destroy the conductor relating to the fuse. When processor 102 is presented with available software to be loaded onto computing device 100, the fuse is checked to determine if it has been previously blown, or set. If it is set, this indicates that at least one piece of authenticated software has been loaded onto computing device 100, and that only authenticated software can be loaded onto computing device 100. This method of determining the authentication status of computing device 100 is advantageous in that processor 102 does not have to perform an authentication procedure on resident software each time software is available to be loaded onto computing device 100.

In any case, the authentication flag may be set in a number of different ways. In one embodiment, the authentication flag is set only if pre-selected software is loaded into computing device 100 and the pre-selected software is authenticated. In another embodiment, the pre-selected software does not have to be authenticated in order for processor 102 to set the authentication flag. In another embodiment, the authentication flag may be set manually, usually by a factory technician. In this case, computing device 100 is manufactured for the purpose of only receiving authenticated software. The authentication flag may be set by a technician generally by connecting a computer to interface 104 and running a computer program which sets the authentication flag.

In one embodiment, processor 102 performs authentication on software corresponding to the available software. Corresponding software refers to a previously release version of the same software. For example, corresponding software to Microsoft Word 7.0 comprises Microsoft Word 6.0, Microsoft Word 5.0, as well as any versions previously released by Microsoft prior to version 7.0. If the resident software has not been authenticated, processor 102 loads the available software from either programmable storage area 108 or interface 104, as the case may be, to application storage area 106. If the resident software is authenticated, then processor 102 determines whether or not the available software is authenticated. If the available software is also authenticated, processor 102 loads the available software into application storage area 106. If the available software is not authenticated, processor 102 rejects the available software and it is not loaded onto computing device 100.

In another embodiment, processor 102 performs authentication on software unrelated to the available software. In this embodiment, the unrelated software generally controls major functions of computing device 100. For example, the unrelated software comprises operating system software stored in application storage device 106. The operating system software could be checked for authentication prior to any available software being loaded onto computing device 100. If the unrelated software has not been authenticated, processor 102 proceeds to load the available software into application storage area 106. This embodiment may be used if a previous version of the available software is not stored in application storage device 106, or it may be used irregardless of whether or not a previous version of the available software has been already loaded onto computing device 100.

If the unrelated software is not authenticated, processor 102 loads the available software into application storage area 106. If the unrelated software is authenticated, then processor 102 determines whether or not the available software is authenticated. If the available software is not authenticated, processor 102 rejects the available software, and it is not loaded into computing device 100. If the available software is authenticated, then processor 102 loads the available software into application storage area 106.

In yet another embodiment, processor 102 checks for a previous version of the available software and, in addition, checks software unrelated to the available software. In this embodiment, authentication is performed on both the previous version of the available software if it is already loaded onto computing device 100 and on the unrelated software. Processor 102 will then determine whether or not to load the available software based on the results of the authentications. For example, if both software programs are not authenticated, processor 102 will generally load the available software into application storage area 106. If both software programs are authenticated, then processor 102 generally will reject the available software and it will not be loaded into computing device 100. If either software programs are authenticated, then processor 102 may or may not load the available software into computing device 100, based upon a pre-defined methodology. For example, if the operating system software is authenticated, but the related software is not authenticated, then the available software will not be loaded unless it is also authenticated. In this embodiment, a separate authentication flag could be used to indicate the authentication status of each software program.

Figure 2:
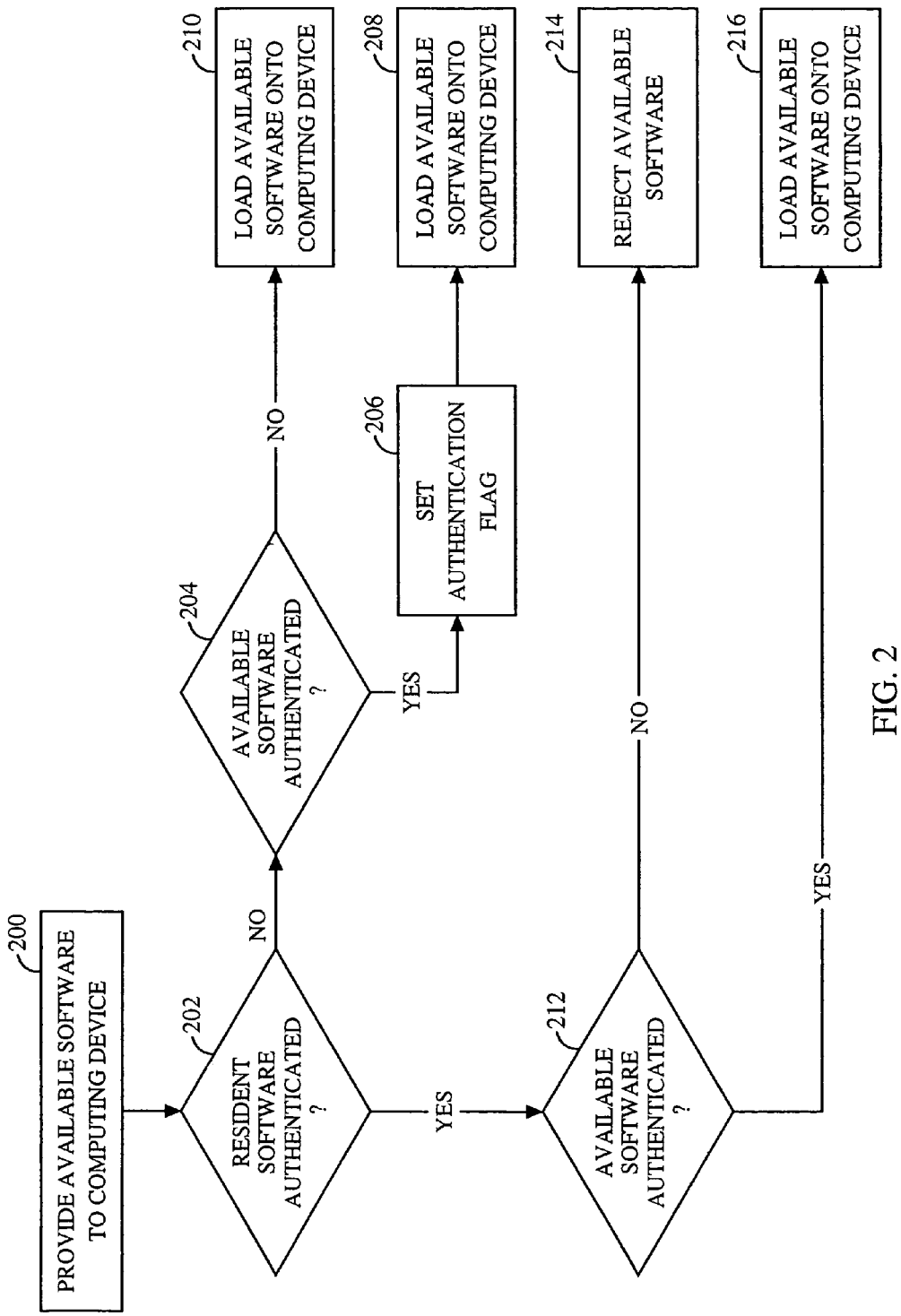
FIG. 2 is a flow diagram illustrating one embodiment of the method for providing configuration management for a computing device.

FIG. 2 is a flow diagram illustrating one embodiment of the method for configuration management for a computing device. In step 200, software to be loaded onto computing device 100 is provided to computing device 100 through interface 104. This software is herein referred to as available software.

In step 202, processor 102 determines whether or not resident software stored in application storage device 106 has been authenticated, using one or more techniques described above. If the resident software is not authenticated, processor then determines whether or not the available software is authenticated, as shown in step 204. Again, processor 102 performs authentication on the available software as described above. If the available software is authenticated, an authentication flag is set in step 206. The authentication flag is an indication that computing device 100 may only accept authenticated software. After the authentication flag has been set, the available software is loaded onto computing device 100, as shown in step 208. If the available software is not authenticated, it is loaded onto computing device 100 without setting the authentication flag, as shown in step 210.

If the resident software has been authenticated by processor 102 in step 202, the available software is checked for authentication in step 212. If the available software is not authenticated, processor 102 rejects the available software, as shown in step 214, and the available software is not loaded onto processing device 100. If the available software is authenticated, then processor 102 loads the available software onto computing device 100, as shown in step 216.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for software configuration management for a computing device having an authentication status, the method comprising:

receiving a request to load available software into an application storage area of the computing device;

determining the authentication status of the computing device, wherein the computing device's authentication status is authenticated if at least one piece of the computing device's resident software has been authenticated, and the computing device's authentication status is not authenticated if none of the computing device's resident software has been authenticated;

determining an authentication status of the available software, wherein the available software's authentication status is authenticated if the available software has been authenticated by the computing device, and the available software's authentication status is not authenticated if the available software has not been authenticated by the computing device; and changing the computing device's authentication status to authenticated and loading the available software into the application storage area if the computing device's authentication status is determined to be not authenticated and the available software's authentication status is determined to be authenticated.

2. A method for software configuration management as defined in claim 1, wherein the authentication status of the computing device cannot be changed from authenticated to not authenticated.

3. A method for software configuration management as defined in claim 1, wherein:
the computing device's authentication status is represented by a hardware fuse; and
the computing device's authentication status is changed to authenticated by blowing the hardware fuse using an electrical current, whereby the computing device's authentication status is not authenticated before the hardware fuse is blown, and the computing device's authentication status is authenticated after the hardware fuse is blown.

4. A method for software configuration management as defined in claim 1, wherein the authentication status of the computing device is indicated by a flag.

5. A method for configuration management as defined in claim 1, wherein the computing device is a portable wireless communication device.

6. A method for software configuration management as defined in claim 1, wherein:
the computing device's resident software comprises a plurality of resident software programs;
each resident software program has a separate authentication flag to indicate its authentication status; and
computing device's authentication status is determined using the separate authentication flags of the plurality of resident software programs.

7. A method for software configuration management as defined in claim 1, further comprising:
loading the available software if the computing device's authentication status is determined to be authenticated and the available software's authentication status is determined to be authenticated, or if the computing device's authentication status is determined to be not authenticated and the available software's authentication status is determined to be not authenticated; and
rejecting the available software if the computing device's authentication status is determined to be authenticated and the available software's authentication status is determined to be not authenticated.

8. A method for software configuration management as defined in claim 1, wherein at least one piece of the computing device's resident software is unrelated to the available software.

9. A method for software configuration management as defined in claim 1, wherein at least one piece of the computing device's resident software corresponds to the available software.

10. A method for software configuration management as defined in claim 1, wherein at least one piece of the computing device's resident software is operating system software.

11. A computing device having software configuration management, comprising:
a processor configured to:
receive a request to load available software into an application storage area of the computing device;
determine an authentication status of the computing device, wherein the computing device's authentication status is authenticated if at least one piece of the computing device's resident software has been authenticated, and the computing device's authentication status is not authenticated if none of the computing device's resident software has been authenticated;
determine an authentication status of the available software, wherein the available software's authentication status is authenticated if the available software has been authenticated by the computing device, and the available software's authentication status is not authenticated if the available software has not been authenticated by the computing device; and
change the computing device's authentication status to authenticated and loading the available software into the application storage area if the computing device's authentication status is determined to be not authenticated and the available software's authentication status is determined to be authenticated; and
a memory coupled to the processor for storing data.

12. A computing device having software configuration management as defined in claim 11, wherein the authentication status of the computing device cannot be changed from authenticated to not authenticated.

13. A computing device having software configuration management as defined in claim 11, wherein:
the computing device's authentication status is represented by a hardware fuse: and
the computing device's authentication status is changed to authenticated by blowing the hardware fuse using an electrical current, whereby the computing device's authentication status is not authenticated before the hardware fuse is blown, and the computing device's authentication status is authenticated after the hardware fuse is blown.

14. A computing device having software configuration management as defined in claim 11, wherein the authentication status of the computing device is indicated by a flag.

15. A computing device having configuration management as defined in claim 11, wherein the computing device is a portable wireless communication device.

16. A computing device having software configuration management as defined in claim 11, wherein:
the computing device's resident software comprises a plurality of resident software programs;
each resident software program has a separate authentication flag to indicate its authentication status; and
computing device's authentication status is determined using, the separate authentication flags of the plurality of resident software programs.

17. A computing device having software configuration management as defined in claim 11, wherein the processor is further configured to:

load the available software if the computing device's authentication status is determined to be authenticated and the available software's authentication status is determined to be authenticated, or if the computing device's authentication status is determined to be not authenticated and the available software's authentication status is determined to be not authenticated; and reject the available software if the computing device's authentication status is determined to be authenticated and the available software's authentication status is determined to be not authenticated.

18. A computing device having software configuration management as defined in claim 11, wherein at least one piece of the computing device's resident software is unrelated to the available software.

19. A computing device having software configuration management as defined in claim 11, wherein at least one piece of the computing device's resident software corresponds to the available software.

20. A computing device having software configuration management as defined in claim 11, wherein at least one piece of the computing device's resident software is operating system software.

21. A storage device embodying instructions which, when executed by a processor, implement a method for configuration management for a computing device, the method comprising:

receiving a request to load available software into an application storage area of the computing device;

determining an authentication status of the computing device, wherein the computing device's authentication status is authenticated if at least one piece of the computing device's resident software has been authenticated, and the computing device's authentication status is not authenticated if none of the computing device's resident software has been authenticated;

determining an authentication status of the available software, wherein the available software's authentication status is authenticated if the available software has been authenticated by the computing device, and the available software's authentication status is not authenticated if the available software has not been authenticated by the computing device; and changing the computing device's authentication status to authenticated and loading the available software into the application storage area if the computing device's authentication status is determined to be not authenticated and the available software's authentication status is determined to be authenticated.

22. A storage device as defined in claim 21, wherein the authentication status of the computing device cannot be changed from authenticated to not authenticated.

23. A storage device as defined in claim 21, wherein the computing device is a portable wireless communication device.

24. A storage device as defined in claim 21, wherein:

the computing device's resident software comprises a plurality of resident software programs;

each resident software program has a separate authentication flag to indicate its authentication status; and computing device's authentication status is determined using the separate authentication flags of the plurality of resident software programs.

25. A storage device as defined in claim 21, the method further comprising:

loading the available software if the computing device's authentication status is determined to be authenticated and the available software's authentication status is determined to be authenticated, or if the computing device's authentication status is determined to be not authenticated and the available software's authentication status is determined to be not authenticated; and rejecting the available software if the computing device's authentication status is determined to be authenticated and the available software's authentication status is determined to be not authenticated.

26. A storage device as defined in claim 21, wherein at least one piece of the computing device's resident software is unrelated to the available software.

27. A storage device as defined in claim 21, wherein at least one piece of the computing device's resident software corresponds to the available software.

28. A storage device as defined in claim 21, wherein at least one piece of the computing device's resident software is operating system software.

29. A computing device having software configuration management, comprising:

means for receiving a request to load available software into an application storage area of the computing device;

means for determining an authentication status of the computing device, wherein the computing device's authentication status is authenticated if at least one piece of the computing device's resident software has been authenticated, and the computing device's authentication status is not authenticated if none of the computing device's resident software has been authenticated;

means for determining an authentication status of the available software, wherein the available software's authentication status is authenticated if the available software has been authenticated by the computing device, and the available software's authentication status is not authenticated if the available software has not been authenticated by the computing device; and means for changing the computing device's authentication status to authenticated and loading the available software into the application storage area if the computing device's authentication status is determined to be not authenticated and the available software's authentication status is determined to be authenticated.

30. A computing device having software configuration management as defined in claim 29, wherein the authentication status of the computing device cannot be changed from authenticated to not authenticated.

31. A computing device having software configuration management as defined in claim 29, wherein the authentication status of the computing device is indicated by a flag.

32. A computing device having configuration management as defined in claim 29, wherein the computing device is a portable wireless communication device.

33. A computing device having software configuration management as defined in claim 29, wherein:

the computing device's resident software comprises a plurality of resident software programs;

each resident software program has a separate authentication flag to indicate its authentication status; and computing device's authentication status is determined using the separate authentication flags of the plurality of resident software programs.

34. A computing device having software configuration management as defined in claim 29, further comprising:

means for loading the available software if the computing device's authentication status is determined to be authenticated and the available software's authentication status is determined to be authenticated, or if the computing device's authentication status is determined to be not authenticated and the available software's authentication status is determined to be not authenticated; and means for rejecting the available software if the computing device's authentication status is determined to be authenticated and the available software's authentication status is determined to be not authenticated.

35. A computing device having software configuration management as defined in claim 29, wherein at least one piece of the computing device's resident software is unrelated to the available software.

36. A computing device having software configuration management as defined in claim 29, wherein at least one piece of the computing device's resident software corresponds to the available software.

37. A computing device having software configuration management as defined in claim 29, wherein at least one piece of the computing device's resident software is operating system software.

\* \* \* \* \*